United States Patent [19]
Okada et al.

[11] Patent Number: 5,558,590
[45] Date of Patent: Sep. 24, 1996

[54] GEARED STEERING DEVICE FOR CRAWLER VEHICLE AND CONTROL UNIT THEREFOR

[75] Inventors: Toshikazu Okada; Hiroshi Itogawa; Hidekazu Nagase, all of Hirakata, Japan

[73] Assignee: Kabushiki Kaisha Komatsu Seisakusho, Tokyo, Japan

[21] Appl. No.: 188,440

[22] Filed: Jan. 28, 1994

[30] Foreign Application Priority Data

Jan. 28, 1993 [JP] Japan .................................. 5-006096

[51] Int. Cl.⁶ .................................................. B62D 11/08
[52] U.S. Cl. .............................. 475/28; 477/1; 477/35; 180/6.2; 180/9.44
[58] Field of Search ............................. 475/18, 28, 29, 475/30; 477/1, 35; 180/6.2, 6.7, 9.44

[56] References Cited

U.S. PATENT DOCUMENTS

| | | | |
|---|---|---|---|
| 4,327,603 | 5/1982 | Zaunberger et al. | 475/28 X |
| 4,784,232 | 11/1988 | Leboime | 180/6.2 |
| 5,195,600 | 3/1993 | Dorgan | 475/28 X |

FOREIGN PATENT DOCUMENTS

| | | | |
|---|---|---|---|
| 55-101139 | 12/1980 | Japan . | |
| 1-501054 | 4/1989 | Japan . | |
| 1523409 | 11/1989 | U.S.S.R. | 475/28 |
| 8001597 | 8/1980 | WIPO . | |
| 8802715 | 4/1988 | WIPO . | |

*Primary Examiner*—Khoi Q. Ta
*Attorney, Agent, or Firm*—Richards, Medlock & Andrews

[57] ABSTRACT

A geared steering device (30) selectively operates rightside and leftside driving mechanisms (2,3) of a crawler vehicle (1) for more efficient operation of the crawler vehicle. The geared steering device (30) comprises a power input drive element (33) for inputting a driving power from a prime mover (7), rightside and leftside steering brakes (38R, 38L), rightside and leftside direct-coupled clutches (36, 44), a turn clutch (46), three arrays of planet gear trains (40, 43 and 48), and power output shafts (32R, 32L) coupled to right and leftside steering brake hubs (34R, 34L). A control unit compares an actual steering ratio of a geared steering device (30) with a designated steering ratio, outputs control signals to respective solenoid valves for controlling the direct-coupled clutches, the turn clutch or a steering brake so as to cause the actual steering ratio to approximate the designated steering ratio. The control unit outputs an engagement signal to the one of the direct-coupled clutches (36 and 44) on the side opposite to a steering direction entered by the steering lever (57).

21 Claims, 9 Drawing Sheets

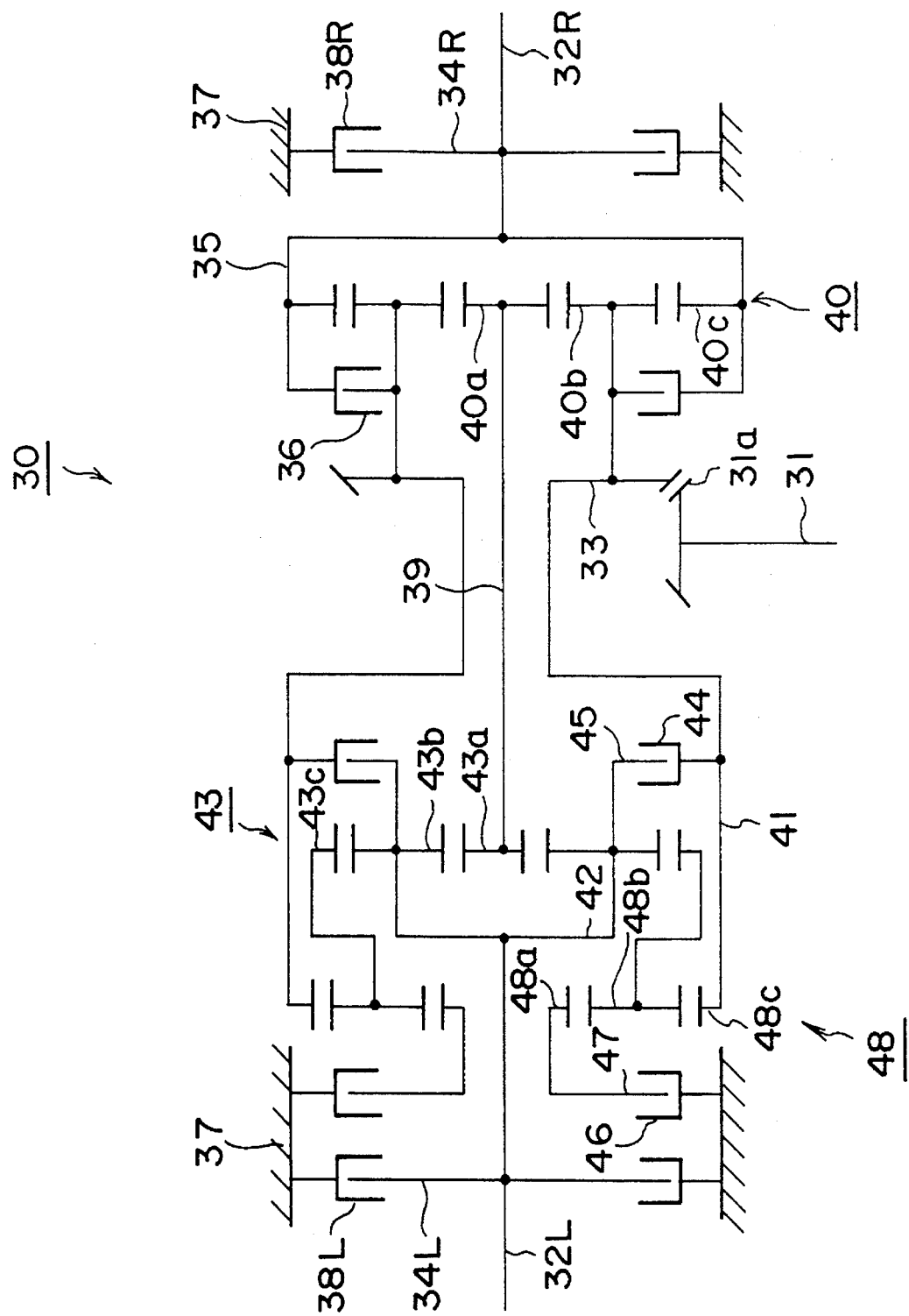
F I G. 1

GEARED STEERING DEVICE FOR CRAWLER VEHICLE AND CONTROL UNIT THEREFOR

FIELD OF THE INVENTION

The present invention relates to a driving device for a crawler vehicle, and, more particularly, to a geared steering device which selectively actuates a rightside drive mechanism and a leftside drive mechanism of the crawler vehicle for efficiently steering the crawler vehicle. The invention also relates to a control unit for such a driving device.

BACKGROUND OF THE INVENTION

Geared steering devices for a crawler vehicle have been proposed, for example, in the Published Japanese Translations of PCT Patent Applications from Other Countries No. 501139-1980. As shown in FIG. 5, a vehicle 1 having geared steering devices mounted thereon has a travel device comprising a rightside track shoe 2 and a leftside track shoe 3. Each of these track shoes 2, 3 is driven by a respective one of drive sprockets 6R, 6L which are connected to a prime mover driving device 7, such as an internal combustion engine. Specifically, as shown in FIG. 6, a driving power of the driving device 7 is transmitted to each drive sprocket 6R and 6L through an input shaft 9, and respective ones of geared steering devices 8R, 8L, output shafts 10R, 10L, and final reduction gears 4R, 4L.

The operations of conventional geared steering devices 8R, 8L in a high speed mode, a low speed mode, and a braking mode will be described with reference to a skeletonized illustration thereof in FIG. 12.

In the high speed mode, brakes 11R, 11L and low speed clutches 12R, 12L are released, and the rotatable housings 14R, 14L are coupled to drive hubs 15R, 15L by engaging high speed clutches 13R, 13L. Accordingly, the input shaft 9 is directly gear-engaged with housings 14R, 14L, and the output shafts 10R, 10L are directly gear-engaged with the brake hubs 22R, 22L. Therefore, the driving force of a prime mover 7 directly drives the output shafts 10R, 10L by means of the input shaft 9 through bevel gears 23, 24 so that the rotation of the input shaft 9 is transmitted to the output shafts 10R, 10L at the speed ratio of 1 to 1.

In the low speed mode, although the high speed clutches 13R, 13L and brakes 11R, 11L are released, the hubs 16R, 16L are secured to the fixed housing 17 by the engagement of the low speed clutches 12R, 12L, and the sun gears 18R, 18L are also fixed. Therefore, the planet gears 19R, 19L move around the sun gears 18R, 18L when the planet gears 19R, 19L are driven by the ring gears 20R, 20L, which are attached to input housings 14R, 14L. As it is common to utilize a plurality of planet gears rotatably mounted on a common carrier, the planet gears of a planet gear train will be referred to collectively as a carrier gear. With this arrangement, carriers gears 21R, 21L rotate at a speed reduced by a specified reduction gear ratio, and the output shafts 10R, 10L also rotate at the same rotation rate through the drive hub 15R, 15L being directly coupled to carrier gears 21R, 21L.

In the braking mode, the high speed clutches 13R, 13L and the low speed clutches 12R, 12L are released. Therefore, the torque transmission from the input shaft 9 to the output shafts 10R, 10L is interrupted. Simultaneously, brakes 11R, 11L are engaged, and therefore brake hubs 22R, 22L directly couple the output shafts 10R, 10L to the fixed housing 17. Thus, the output shafts 10R, 10L and the related track shoes 2, 3 are braked.

A control unit of a vehicle having a conventional clutch/brake type steering device has been proposed in the Published Japanese Translations of PCT Patent Applications from Other Countries No. 501054-1989. Specifically, this reference has disclosed a technology for a feedback control of a hydraulic pressure of the clutches or brakes so that a designated turning radius of the vehicle, which is determined in accordance with an amount of operation of a steering lever, may be obtained by sensing the rotation rates of rightside and leftside track shoe drive shafts. Such control unit is free from braking loss, owing to the specified gear ratio, and enables the vehicle to turn in a turning radius of approximately 10 m. It is, of course, provided with the functions of the known clutch/brake type turning device which depend on brake operation.

However, for such control unit a total of six discs has been required for the high speed clutches 13R, 13L, the low speed clutches 12R, 12L, and the brakes 11R, 11L. Similarly, a total of six sets of hydraulic control valves has been required for the rightside and leftside control mechanisms. Therefore, the control unit would be expensive. The vehicle is provided with the high speed clutches 13R, 13L and the low speed clutches 12R, 12L at its rightside and its leftside, and therefore a high speed stage or a low speed stage can be provided both at the rightside and at the leftside of the vehicle. Accordingly, if a three stage transmission is provided, the forward and rearward vehicle speeds can be shifted in six steps. However, such transmission system would be excessive for a vehicle for which a three stage transmission system is sufficient.

On the other hand, a control unit of a vehicle having geared steering devices 8R, 8L requires the capability of obtaining a designated turning radius of the vehicle which is determined with an operating amount of the steering lever. Unless the feedback control is given, there may be a risk of steering opposite to an operation of the operator in accordance with a degree of load which acts on the vehicle. However, such control technique has not yet been disclosed.

SUMMARY OF THE INVENTION

An object of the present invention, made to solve the problems of the prior art as described above, is to provide geared steering devices which selectively actuate rightside and leftside drive mechanisms and a control unit therefor to efficiently steer a crawler vehicle.

A geared steering device is provided for a crawler vehicle, having brakes, high speed clutches, and low speed clutches which are engaged or disengaged, and planet gear trains to receive a driving power of a prime mover at the input shaft, to control rightside and leftside output shafts for high speed rotation, low speed rotation, and braking to thereby control the steering of rightside and leftside track shoes of the crawler vehicle. A geared steering device in accordance with the invention comprises a power input drive element adapted to receive driving power from the prime mover; a fixed housing; a first steering brake for engaging and releasing the first output shaft with respect to the fixed housing; a first rotatable housing coupled to the first output shaft; a first direct-coupled clutch for engaging and releasing the first rotatable housing with respect to the power input drive element; and a center shaft. A first planet gear train has a first sun gear, a first carrier gear, and a first ring gear; with each of the first sun gear, the first carrier gear, and the first ring gear being connected to a respective different one of the center shaft, the power input drive element, and the first rotatable housing.

The geared steering device further comprises a second steering brake for engaging and releasing the second output shaft with respect to a fixed housing; a second rotatable housing coupled to the power input drive element; and a drive hub coupled to the second output shaft. A second planet gear train has a second sun gear, a second carrier gear, and a second ring gear; with each of the drive hub and the center shaft being connected to a respective different one of the second sun gear, the second carrier gear, and the second ring gear. A second direct-coupled clutch is provided for engaging and releasing the second rotatable housing with respect to the second carrier gear.

The geared steering device further comprises a third planet gear train and a turn clutch for engaging and releasing one of the gears of the third planet gear train with respect to a fixed housing. The third planet gear train has a third sun gear, a third carrier gear, and a third ring gear; with each of the second rotatable housing and the turn clutch being connected to a respective different one of the third sun gear, the third carrier gear, and the third ring gear, wherein the gear of the second planet gear train other than the gears connected to the center shaft and the drive hub is coupled with a gear of the third planet gear train other than the gears of the third planet gear train which are connected to the turn clutch and the second rotatable housing.

In addition, the first sun gear can be provided on the center shaft, the first carrier gear can be provided on the power input drive element, and the first ring gear can be provided on the first rotatable housing.

In a first embodiment, the second sun gear can be provided on the center shaft, and the second carrier gear can be coupled to the drive hub. The third sun gear can be provided on the turn clutch hub, and the third ring gear can be provided on the second rotatable housing, whereby the second ring gear is coupled to the third carrier gear.

In a second embodiment, the third carrier gear can be coupled to the second rotatable housing, and the second ring gear can be coupled to the third ring gear. In a third embodiment, the second ring gear can be coupled to the center shaft and the second sun gear can be coupled to the third carrier gear.

In addition, a control unit is provided which comprises a controller capable of comparing an actual steering ratio, calculated from a rotation rate of the power input part of the geared steering device and a rotation rate of the turn clutch, and a designated steering ratio inputted by the operator via a steering lever. The controller is capable of outputting a control signal for the direct-coupled clutch, the turn clutch or the steering brake for causing the actual steering ratio to approach and approximate the designated steering ratio. The control signal can be outputted to a solenoid valve for controlling the direct-coupled clutch, the turn clutch or the steering brake. Furthermore, an engaging signal can be outputted to the direct-coupled clutch for the side opposite to a steering direction inputted by the steering lever.

In straight travel with an arrangement as described above, both steering brakes and the turn clutch are released, and both direct-coupled clutches are engaged. Therefore, both output shafts rotate at the same rotation rate. When a steering operation is started in the direction of a first output shaft, the direct-coupled clutch for the first output shaft begins to slide and the vehicle begins to turn in the direction of the steering operation. When a steering operation is increased sufficiently in the direction of the first output shaft, the first direct-coupled clutch is released, the turn clutch begins to engage while sliding, and the turning radius in the direction of steering operation decreases. When the steering operation is increased to a further point in the direction of the first output shaft, the first steering brake begins engagement while sliding and the turning radius in the direction of the steering operation further decreases. In addition, when the steering operation is increased to a still further point in the direction of the first output shaft, the first steering brake is completely engaged and the vehicle proceeds in a pivot turn. In addition, when the steering operation is commenced in the direction of the first output shaft, the second direct-coupled clutch is completely engaged in the geared steering state and loss free steering is carried out. The steering operation in the direction of the second output shaft is the same as the steering operation in the direction of the first output shaft.

In the controller, an actual steering ratio, calculated from a rotation rate of the power input part of the geared steering device and a rotation rate of the turn clutch, is compared with a designated steering ratio manually inputted by the operator by means of a steering lever. A control hydraulic signal for the direct-coupled clutch, the turn clutch or the steering brake for approximating the actual steering ratio to the designated steering ratio is then outputted to a solenoid valve for controlling the direct-coupled clutch, the turn clutch or the steering brake. The direct-coupled clutch, the turn clutch or the steering brake is controlled in accordance with the operating amount of the steering lever. The controller also outputs an engaging signal to the direct-coupled clutch for the side opposite to a steering direction entered by the steering device so that the actual steering ratio is approximated to the designated steering ratio.

BRIEF DESCRIPTION OF THE DRAWINGS

FIG. 1 is a skeleton illustration of a geared steering device in a first embodiment according to the present invention;

DETAILED DESCRIPTION OF THE PREFERRED EMBODIMENT

Figure 2:
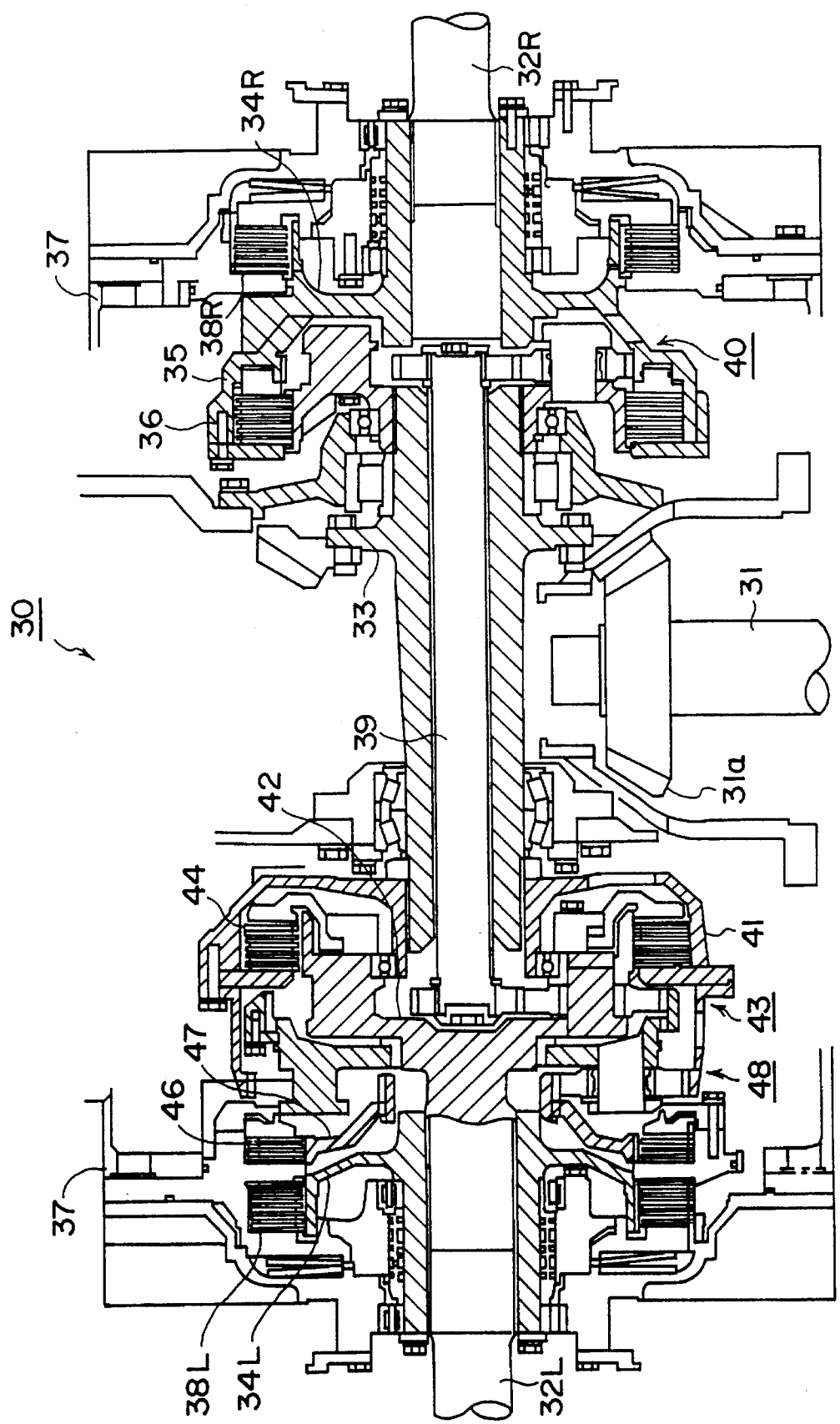
FIG. 2 is a cross-sectional view of the geared steering device of FIG. 1.
Figure 5:
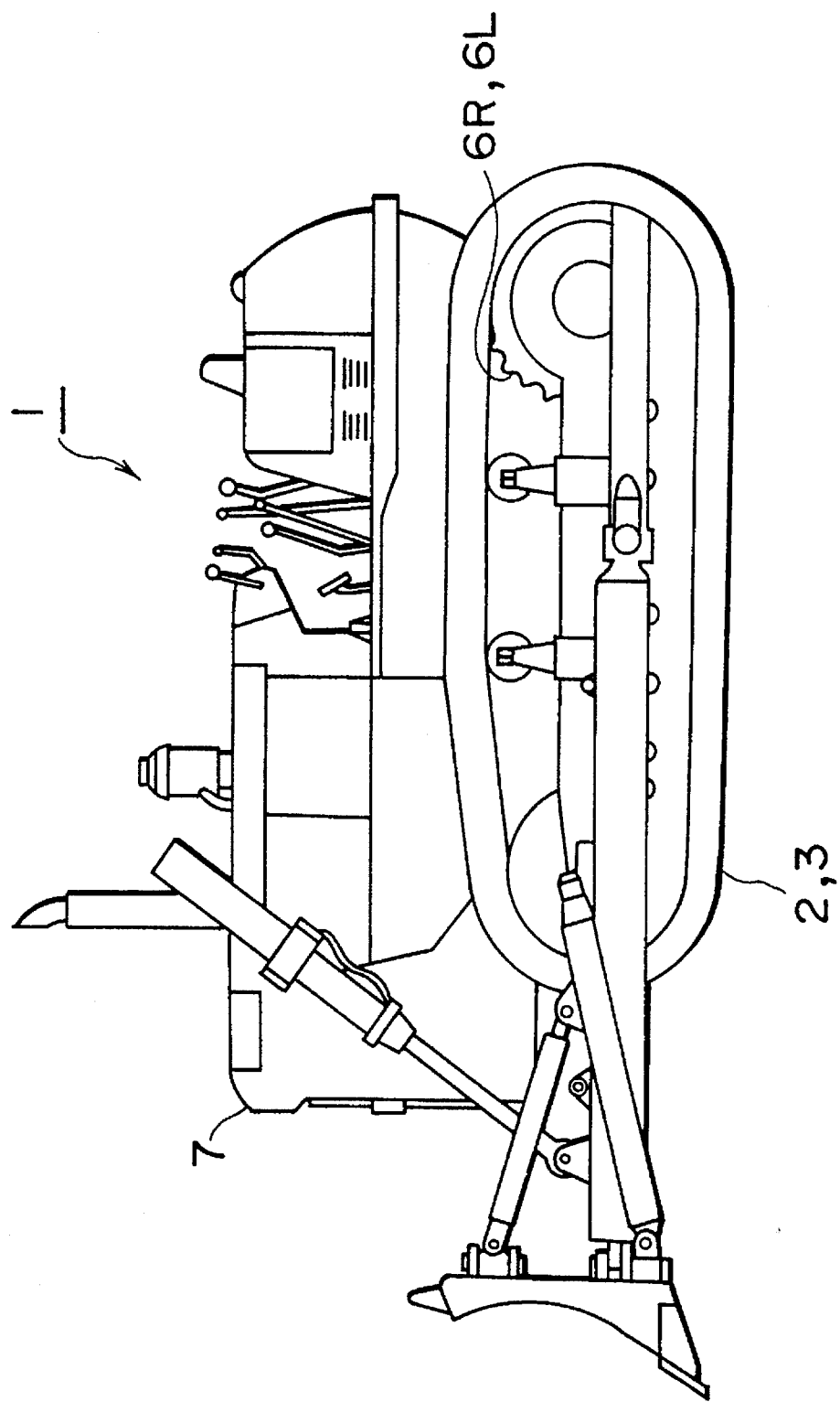
FIG. 5 is a side elevational view of a crawler vehicle.
Figure 6:
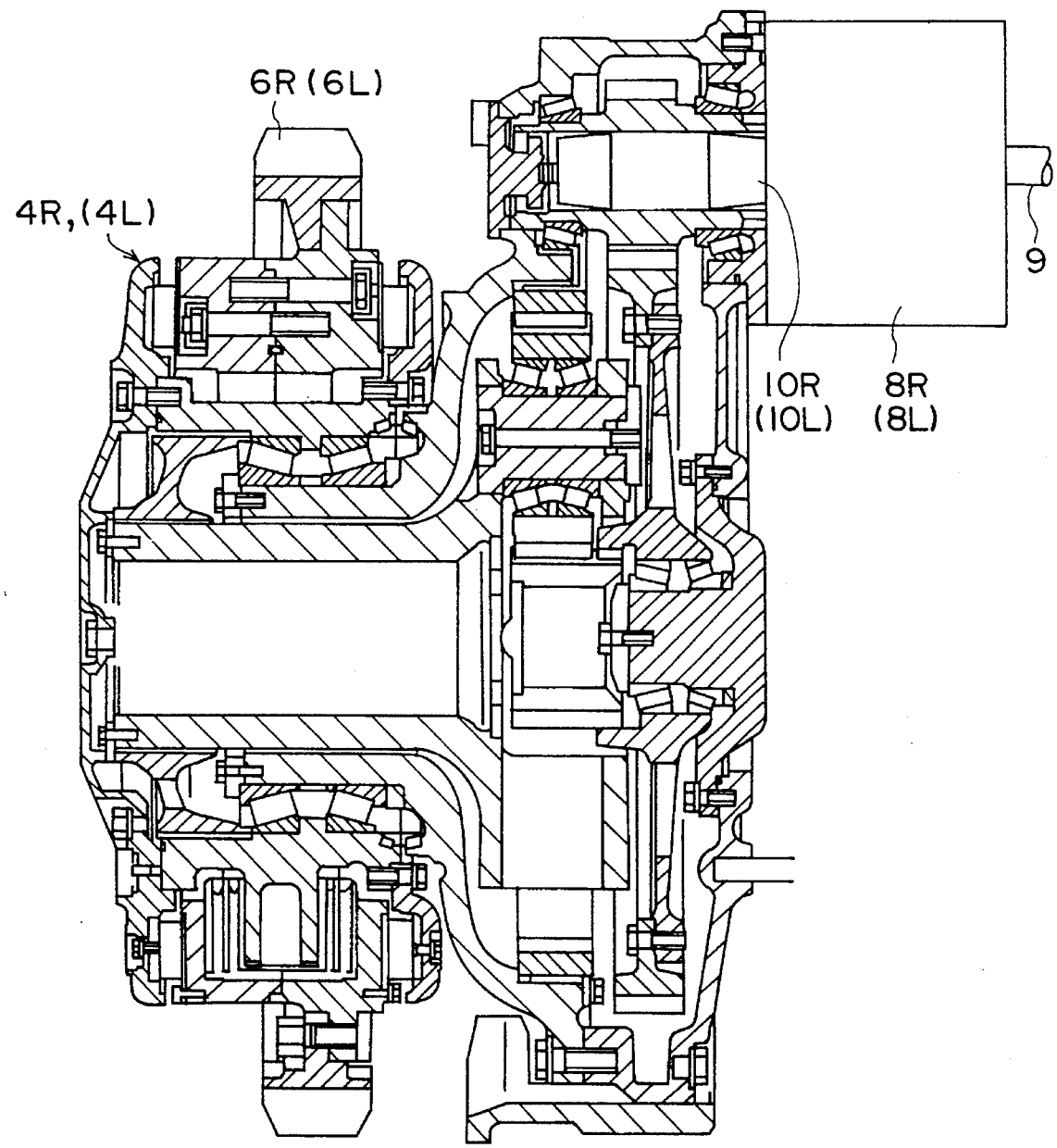
FIG. 6 is a cross-sectional view of the final reduction gears, which are coupled to the geared steering device of the crawler vehicle.

Referring to FIGS. 1, 2 and 5, there is shown a geared steering device 30 of a crawler vehicle 1 in accordance with the first embodiment of the present invention.

The geared steering device 30, having a gear skeleton as shown in FIG. 1, receives a driving power of a prime mover 7 through the power input shaft 31 and delivers the driving power through power output shafts 32R, 32L. The driving force from output shafts 32R, 32L works to drive the rightside track shoe 2 and the leftside track shoe 3 through the drive sprockets 6R, 6L, respectively, of the crawler vehicle 1 shown in FIG. 5.

A power input drive element 33, for inputting the driving power of the prime mover 7 from the power input shaft 31 through a bevel gear 31a, is provided at the center of the geared steering device 30. At the right side of the power input drive element 33, a first rotatable housing 35 is coupled to a rightside output shaft 32R and a rightside steering brake hub 34R. A rightside direct-coupled clutch 36 provides for engaging and releasing the rightside of power input drive element 33 with respect to the first rotatable housing 35. A rightside steering brake 38R provides for engaging and releasing the rightside steering brake hub 34R with respect to the fixed housing 37. A center shaft 39 is arranged on the same axial line as the rightside output shaft 32R and a first planet gear train 40. The first planet gear train 40 comprises a sun gear 40a coupled to the center shaft 39, a carrier gear 40b coupled to the power input drive element 33, and a ring gear 40c coupled to the first rotatable housing 35, with carrier gear 40b engaging the sun gear 40a and the ring gear 40c.

A second rotatable housing 41 is coupled to the leftside of the power input drive element 33. A drive hub 42 is coupled to a leftside output shaft 32L and a leftside steering brake hub 34L. A second planet gear train 43 comprises a carrier gear 43b coupled to the drive hub 42, a ring gear 43c engaged with the carrier gear 43b, and a sun gear 43a coupled to the center shaft 39 and engaged with the carrier gear 43b. A leftside direct-coupled clutch hub 45 is coupled to the carrier gear 43b of the second planet gear train 43 and is simultaneously connected to the second rotatable housing 41 through the leftside direct-coupled clutch 44. A turn clutch hub 47 is engaged or released with respect to the fixed housing 37 by the turn clutch 46. A third planet gear train 48 comprises a sun gear 48a coupled to the turn clutch hub 47, a carrier gear 48b engaged with the sun gear 48a, and a ring gear 48c engaged with the carrier gear 48b and coupled to the second rotatable housing 41. The ring gear 43c of the second planet gear train 43 is coupled to the carrier gear 48b of the third planet gear train 48.

The operation of the geared steering device 30 is described below.

Table I shows the relationship between engagement (ON) and releasing (OFF) of the direct-coupled clutches 36, 44, the turn clutch 46, and the steering brakes 38R, 38L, and the operating condition of the crawler vehicle.

TABLE 1

| | Straight travel | Counter-clock-wise slow turn | Clock-wise slow turn | Counter-clock-wise pivot turn | Clock-wise pivot turn |
|---|---|---|---|---|---|
| Leftside steering brake | OFF | OFF | OFF | ON | OFF |
| Turning clutch | OFF | ON | ON | OFF | OFF |
| Leftside direct-coupled clutch | ON | OFF | ON | OFF | ON |
| Rightside direct-coupled clutch | ON | ON | OFF | ON | OFF |
| Rightside steering brake | OFF | OFF | OFF | OFF | ON |

In straight travel, the steering brakes 38R, 38L and the turn clutch 46 are released, and the direct-coupled clutches 36, 44 are engaged. Therefore, the output shafts 2R, 32L are rotated at the same rotation rate.

In a slow, gentle counterclockwise turn, the steering brakes 38R, 38L and the left direct-coupled clutch 44 are released, and the turn clutch 46 and the rightside direct-coupled clutch 36 are engaged. Therefore, the vehicle slowly turns counterclockwise at a specified speed ratio which is determined in accordance with the gear ratio of the respective gear trains.

In a counterclockwise pivot turn, the turn clutch 46, the leftside direct-coupled clutch 44, and the rightside steering brake 38R are released, and the leftside steering brake 38L and the rightside direct-coupled clutch 36 are engaged. Therefore, the leftside track shoe 3 is stopped, the rightside track shoe 2 rotates at the same rotation rate as the input rotation rate, and the vehicle 1 makes a sharp turn in the counterclockwise direction.

As the operation for the slow, gentle clockwise turn and the clockwise pivot turn can be easily understood from Table 1 and the description of the operation of the slow, gentle counterclockwise turn and the counterclockwise pivot turn, a detailed description thereof is omitted.

A cross-sectional view of the geared steering device 30, showing an arrangement corresponding to the gear skeleton of FIG. 1, is illustrated in FIG. 2, with each component being given the same respective reference number in both figures.

Figure 3:
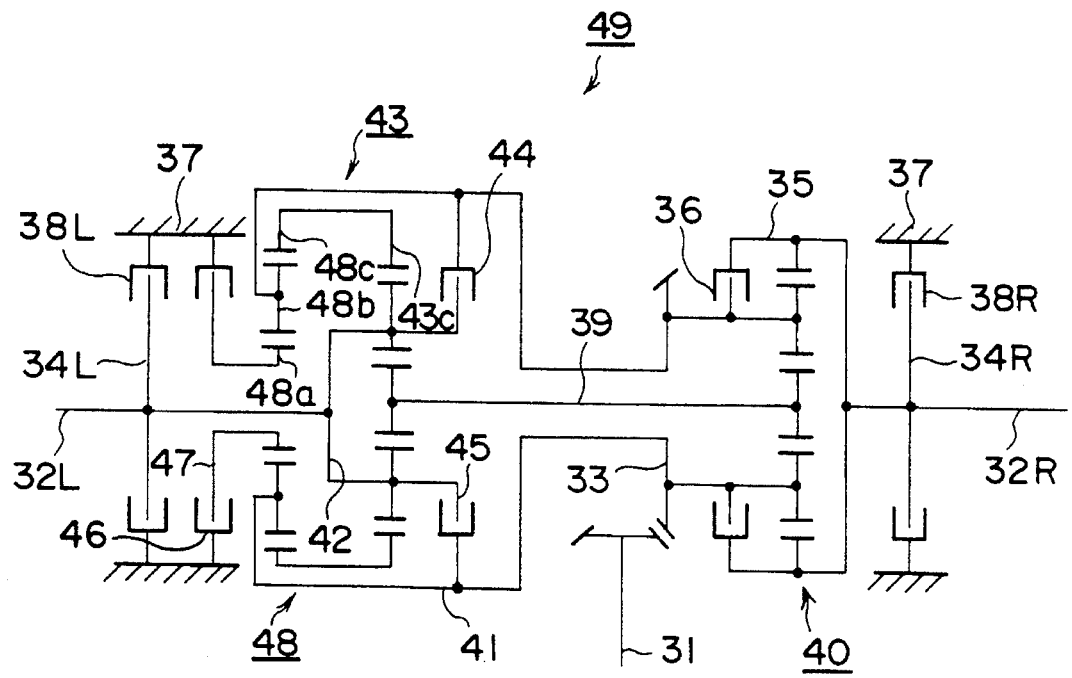
FIG. 3 is a skeleton illustration of a geared steering device in a second embodiment according to the present invention.

FIG. 3 shows a gear skeleton of a geared steering device 49 of a crawler vehicle 1 according to the second embodiment of the present invention. The components of this second embodiment, which are common to the gear skeleton of the geared steering device 30 of FIG. 1, are given the same respective reference numbers, and a detailed description of the configuration thereof is omitted.

The second embodiment 49 differs from the first embodiment 30 in that the carrier gear 48b of the third planet gear train 48 is coupled to the second housing 41, and the ring gear 43c of the second planet gear train 43 and the ring gear 48c of the third planet gear train 48 are coupled to each other. As the operation of the second embodiment 49 is identical to that of the first embodiment 30, a detailed description thereof is omitted.

Figure 4:
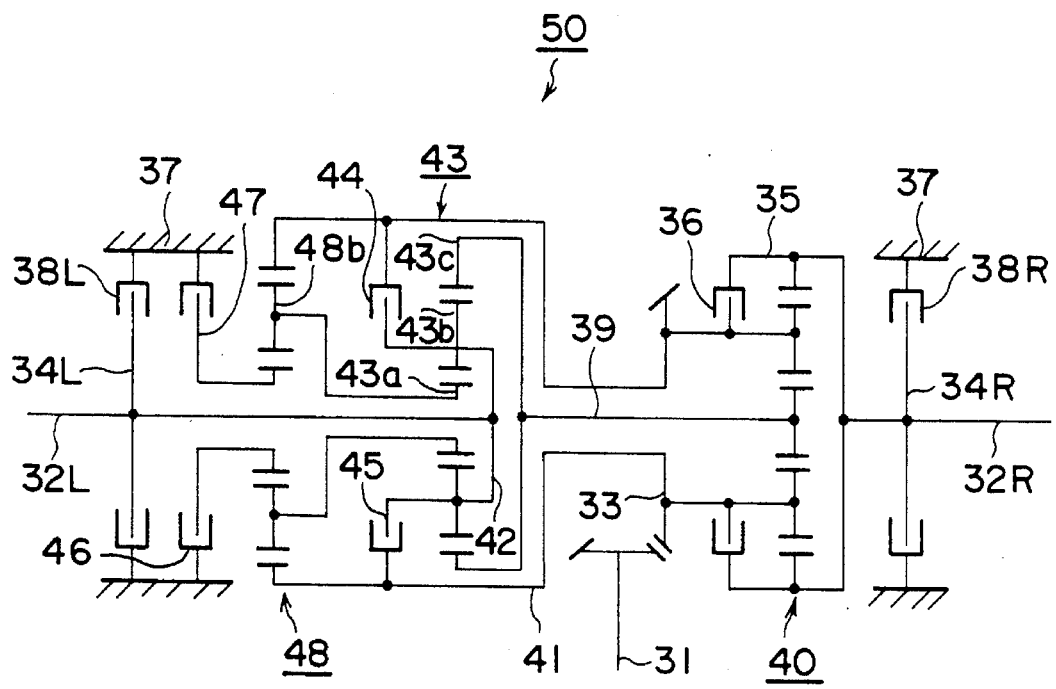
FIG. 4 is a skeleton illustration of a geared steering device in a third embodiment according to the present invention.

FIG. 4 shows a gear skeleton of a geared steering device 50 of a crawler vehicle 1 according to the third embodiment of the present invention. The components of this third embodiment, which are common to the gear skeleton of the geared steering device 30 of FIG. 1, are given the same respective reference numbers, and a detailed description of the configuration thereof is omitted.

The third embodiment 50 differs from the first embodiment 30 in that the ring gear 43c of the second planet gear train 43 is coupled to the center shaft 39, and the sun gear 43a of the second planet gear train 43 and the carrier gear 48b of the third planet gear train 48 are coupled to each other. As the operation of the third embodiment 50 is identical to that of the first embodiment 30, a detailed description is omitted.

A control unit for controlling the operation of geared steering devices 30, 49 and 50 will now be described with reference to FIGS. 7, 8 and 9.

Figure 7:
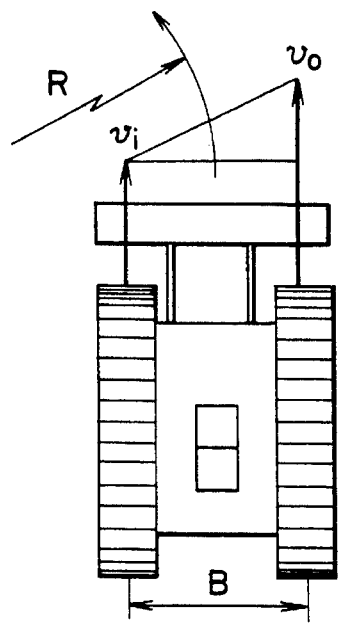
FIG. 7 is an illustration of a crawler vehicle in a turning operation.

The turning radius R of the crawler vehicle 1 can be expressed as shown below according to the steering ratio $\epsilon = V_o/V_i$, based on the assumption that the outside track turning speed is $V_o$, the inside track turning speed is $V_i$, and a gauge width (the distance between the centerlines of the inside track and the outside track) is B, as shown in FIG. 7.

$$R = \{(\epsilon+1)/(\epsilon-1)\} \bullet (B/2) \qquad (1)$$

If, for example, the fixed steering ratio for the leftside is assumed as $\epsilon_{LO}$, and, regarding the characters suffixed to the number of teeth Z of the planet gear, "R" denotes the ring gear, "S" denotes the sun gear, "2", denotes the second planet gear train and "3" denotes the third planet gear train, the steering ratio $\epsilon$ can be expressed as shown below;

$$1/\epsilon = \{Z_{R2}/(Z_{R2}+Z_{S2})\} \bullet \{Z_{S3}/(Z_{S3}+Z_{R3})\} \bullet \rho B \bullet (N_{SC}/N_{MO}) + (1/\epsilon_{LO}) \qquad (2)$$

where, $$1/\epsilon_{LO}: \{Z_{R2}/(Z_{R2}+Z_{S2})\} \bullet [\{Z_{R3}/(Z_{R3}+Z_{S3})\} + Z_{S2}/Z_{R2}]$$

ρB: Reduction gear ratio from the transmission output shaft to power input shaft 31 $N_{SC}$: Rotation rate of the turn clutch $N_{MO}$: Rotation rate of the transmission output shaft A current turning radius R of the vehicle is always obtained from equations (1) and (2) by detecting the rotation rate $N_{SC}$ of the turning clutch and calculating the rotation rate $N_{MO}$ of the transmission from the rotation rate $N_{TO}$ of the torque converter output shaft and the transmission speed step k.

Accordingly, the designated steering ratio $\epsilon_a$ is calculated from equation (1) so as to obtain the turning radius $R_a$ of the crawler vehicle 1 which the operator desires by operating the steering lever 57. Then the turning clutch rotation rate $N_{SC}$ /the transmission output shaft rotation rate $N_{MO}$ are calculated from the equation (2) by using this steering ratio $\epsilon_a$. Thus, the turning radius $R_a$ of the crawler vehicle 1 which the operator desires can be obtained by controlling the hydraulic pressures for the direct-coupled clutches 36, 44, the turn clutch 46, and the steering brakes 38R, 38L. In other words, even though the direct-coupled clutches 36, 44 are half-engaged with the turn clutch 46 or one of the steering brakes 38R, 38L, a variation thereof appears as a value of variation in the turning clutch rotation rate $N_{SC}$ and the transmission output shaft rotation rate $N_{MO}$, and therefore the turning radius R of the crawler vehicle can be obtained from equation (1) by detecting the turning clutch rotation rate $N_{SC}$ and the transmission output shaft rotation rate $N_{MO}$, and calculating the steering ratio $\epsilon$ from equation (2).

Figure 8:
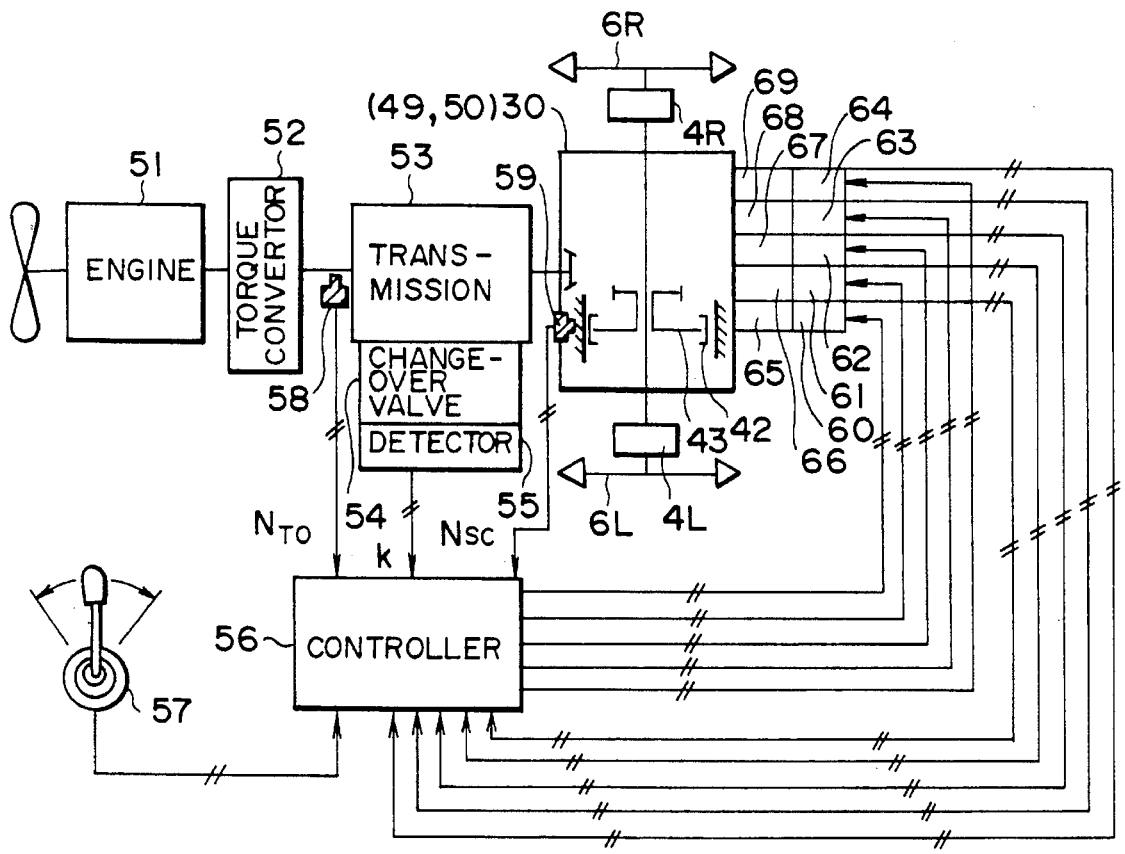
FIG. 8 is an illustration of a control unit for the geared steering device.

FIG. 8 shows a control unit for controlling the geared steering device 30, 49 or 50 according to the present invention. The output of an engine 51, serving as the prime mover, is connected through a torque converter 52 (hereinafter referred to as the "torcon") to a transmission 53. The output of the transmission 53 is the input shaft 31 of the geared steering device 30, 49 or 50. The rightside final reduction gear 4R and the leftside final reduction gear 4L are connected between the output shafts of the geared steering device 30, 49 or 50 and the respective drive sprockets 6R, 6L which are fixedly mounted on the final reduction gears 4R and 4L.

The output of a hydraulic pressure detector 55 for the speed step changeover valve 54 for transmission 53 is connected to a controller 56 to input to controller 56 a signal representative of the transmission speed step k. A steering lever 57 is manually actuated by the vehicle operator to input a signal to controller 56 representing the desired steering operation. A torcon output shaft rotation sensor 58 transmits a signal to controller 56 representative of the rotation rate $N_{TO}$ of the torque converter output shaft, which is the input shaft for transmission 53. A rotation sensor 59 on the turn clutch hub 47, which forms part of the geared steering device 30, 49 or 50, transmits to the controller 56 a signal representative of the detected rotation rate $N_{SC}$ of the turn clutch 46.

The control elements include a solenoid valve 60 for the leftside steering brake 38L, a solenoid valve 61 for the turn clutch 46, a solenoid valve 62 for the leftside direct-coupled clutch 44, a solenoid valve 63 for the rightside direct-coupled clutch 36, a solenoid valve 64 for the rightside steering brake 38R, a hydraulic valve 65 for the leftside steering brake 38L, a hydraulic valve 66 for the turn clutch 46, a hydraulic valve 67 for the leftside direct-coupled clutch 44, a hydraulic valve 68 for the rightside direct-coupled clutch 36, and a hydraulic valve 69 for the rightside steering brake 38R.

Figure 9:
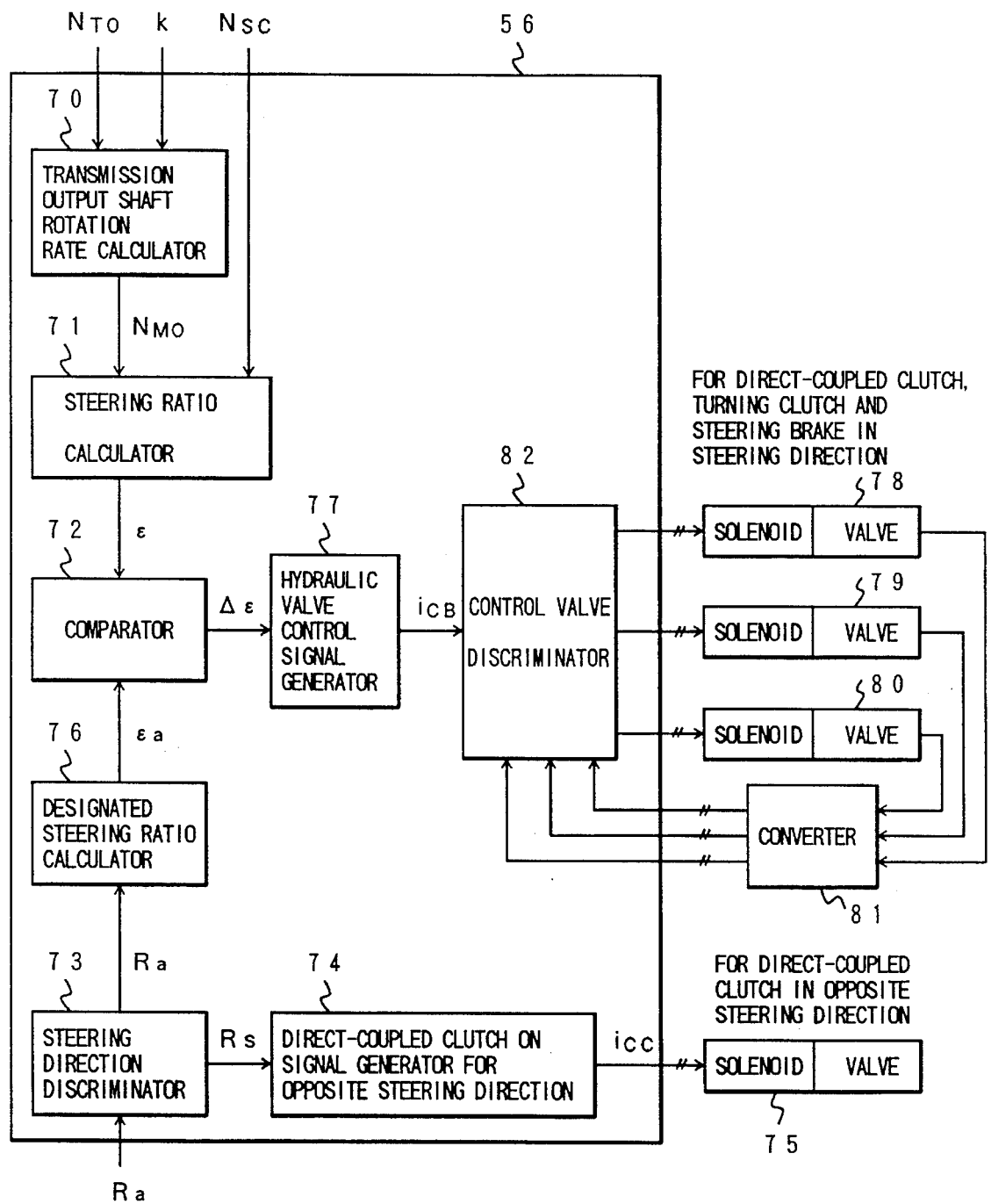
FIG. 9 is a detailed illustration of the controller shown in FIG. 8.

A detailed configuration of the controller 56 of FIG. 8 is illustrated in FIG. 9. The controller 56 calculates the transmission output shaft rotation rate $N_{MO}$ by entering both the torcon output shaft rotation rate $N_{TO}$, detected by the rotation sensor 58, and the transmission speed step k, detected by the hydraulic pressure detector 55, into the transmission output shaft rotation rate calculator 70. The actual steering ratio $\epsilon$ is calculated by entering both the calculated transmission output shaft rotation rate $N_{MO}$ and the turning clutch hub rotation rate $N_{SC}$ into the steering ratio calculator 71, and a signal representative of the actual steering ratio $\epsilon$ is outputted to the comparator 72.

On the other hand, when a signal of the desired turning radius $R_a$ designated by the vehicle operator is inputted from the steering lever 57 (FIG. 8) into the steering direction discriminator 73, a steering direction signal $R_s$ is outputted from the steering direction discriminator 73 to the opposite steering direction direct-coupled clutch ON generator 74. Then an engagement signal $i_{cc}$ is outputted from the opposite steering direction direct-coupled clutch ON generator 74 to the solenoid 75 of the solenoid valve for the opposite steering direction direct-coupled clutch.

Simultaneously, the designated turning radius $R_a$ is outputted from the steering direction discriminator 73 to the designated steering ratio calculator 76. Then a designated steering ratio $\epsilon_a$ is calculated in the designated steering ratio calculator 76, and a signal representative of the designated steering ratio $\epsilon_a$ is outputted to the comparator 72.

The actual steering ratio $\epsilon$ and the designated steering ratio $\epsilon_a$ are compared in the comparator 72, and a steering ratio deviation signal Δε is outputted to the hydraulic valve control signal generator 77. A hydraulic control valve signal $i_{CB}$, which makes the steering ratio deviation signal Δε go to zero, is outputted from the hydraulic valve control signal generator 77 to the solenoid of the solenoid valve 78, 79 or 80 as designated by the control valve discriminator 82. Designation by the control valve discriminator 82 is carried out by converter 81 converting the hydraulic pressure signals from the respective hydraulic pressure valves for solenoid valves 78, 79 and 80 for the direct-coupled clutch, the turn clutch and the steering brake in the steering direction, and outputting the converted signals to the control valve discriminator 82.

The following describes the control of two typical operations of the geared steering device 30 of the crawler vehicle 1. The description of the similar control of the other geared steering devices 49 and 50 is omitted as it would be identical to that for the geared steering device 30.

Figure 10:
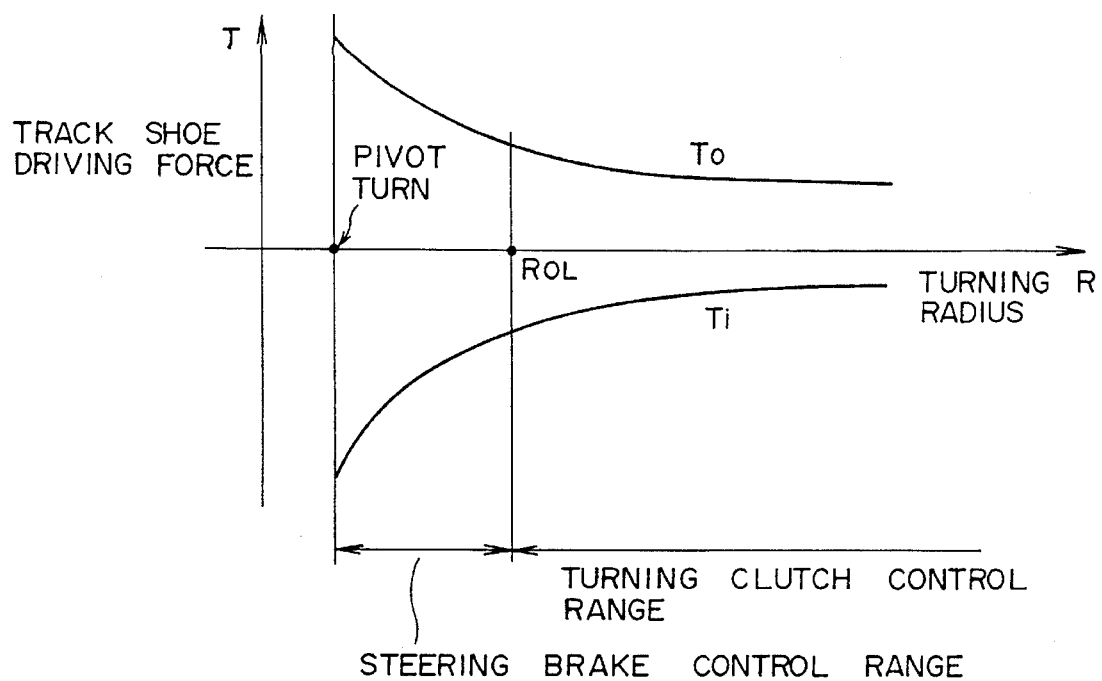
FIG. 10 is a graph showing the relationship between the track shoe driving force and the turning radius when only a traveling load is applied to the crawler vehicle, e.g., without a bulldozing load.

The first case is where the crawler vehicle is not carrying out bulldozing work and undergoes only a traveling load. When the steering lever 57 is manually shifted by the vehicle operator from the neutral position to a leftside position, the inside track shoe driving force $T_i$ and the outside track shoe driving force $T_o$ are shifted from the right side towards the left side in FIG. 10, and the intention of the operator who wishes to reduce the turning radius R is transmitted.

When the steering lever 57 is shifted from the neutral position to an initial leftside position, the leftside direct-coupled clutch 44 starts to slide, but the vehicle 1 does not turn under this condition due to the inside track shoe driving force $T_i$ being<0. Even though the leftside direct-coupled clutch 44 is slid to a larger extent, the vehicle 1 does not turn, and eventually the leftside direct-coupled clutch 44 becomes set to OFF. Successively, the turn clutch 46 begins to be engaged, and the vehicle 1 begins to turn in accordance with an amount of such sliding of the turn clutch 46 (the turning clutch control range).

When the steering lever is shifted further to the left, the turn clutch 46 is completely engaged and the geared steering state is obtained ($R_{OL}$).

When the steering lever is shifted still further to the left, the leftside steering brake 38L begins to be engaged and finally becomes engaged completely, and the vehicle 1 starts a counterclockwise pivot turn (steering brake control range).

Figure 11:
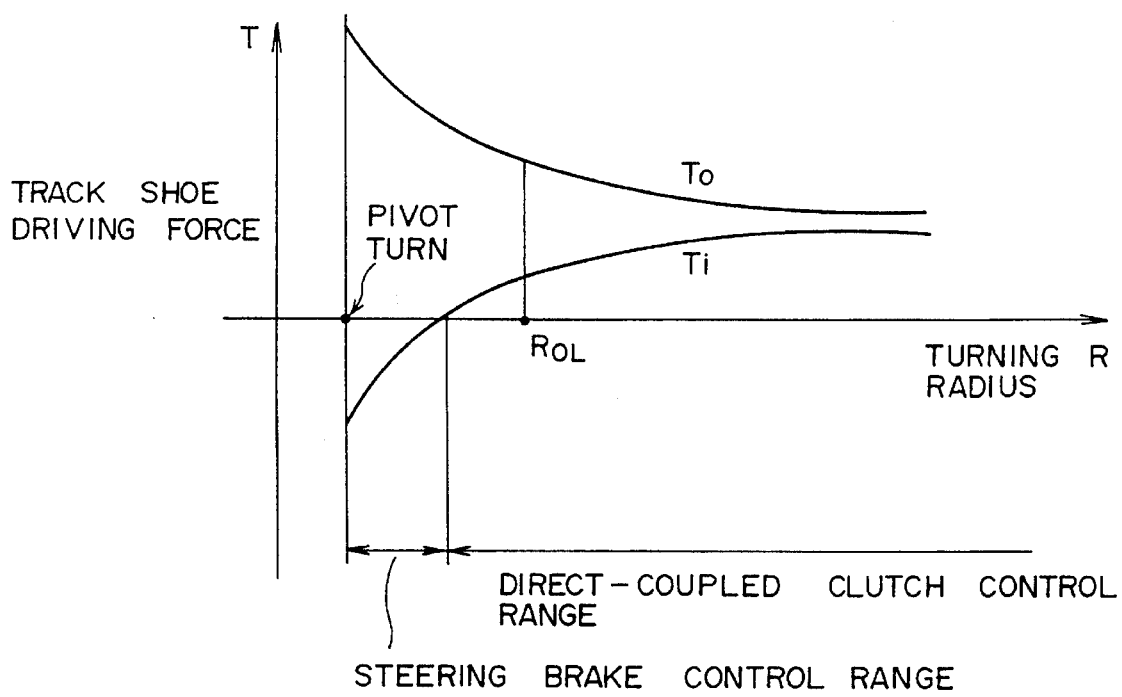
FIG. 11 a graph showing the relationship between the track shoe driving force and the turning radius when a large traveling load as in bulldozing operation is applied to the crawler vehicle.
Figure 12:
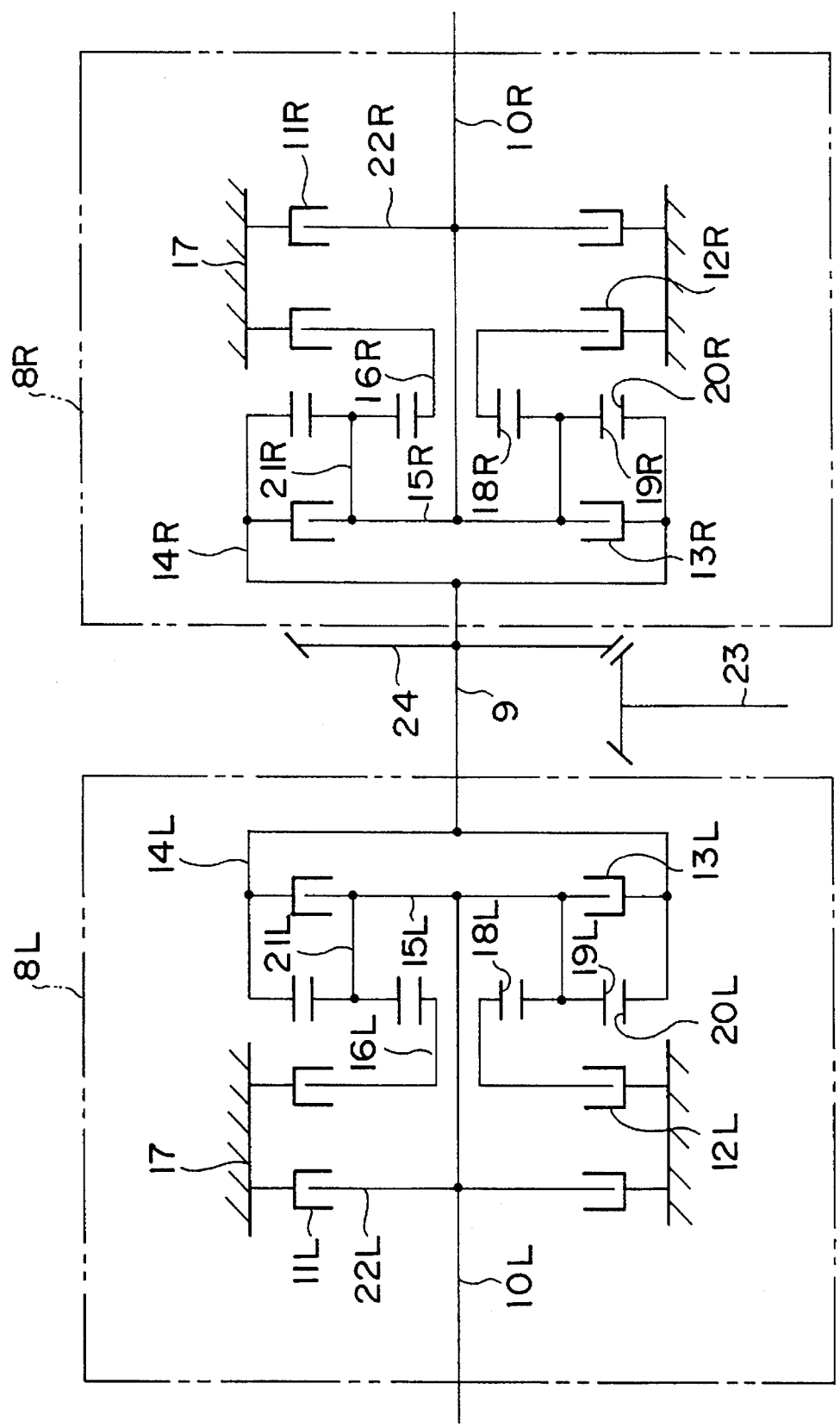
FIG. 12 is a skeleton illustration of a conventional geared steering device.

In the second case, the crawler vehicle 1 undergoes a large traveling load as in a bulldozing operation. When the steering lever 57 is shifted from the neutral position to an initial leftside position, the inside track shoe driving force $T_i$ and the outside track shoe driving force $T_o$ are shifted from the right side towards the left side in FIG. 11, and the intention of the operator who wishes to reduce the turning radius R is transmitted.

When the steering lever 57 is shifted from the neutral position to an initial leftside position, the leftside direct-coupled clutch 44 begins to slide, and the vehicle begins to turn because of the inside track shoe driving force $T_i$ being>0 (direct-coupled clutch control range).

When the steering lever is shifted further to the left, the direct-coupled clutch 44 is set to OFF and the turn clutch 46 becomes completely engaged, and therefore the geared steering state is obtained ($R_{OL}$).

When the steering lever is shifted still further to the left, the turn clutch 46 is set to OFF and the leftside direct-coupled clutch 44 is slid to make the vehicle 1 be in the turning state (direct-coupled clutch control range.)

When the steering lever 57 is shifted even further to the left, the leftside direct-coupled clutch 44 is set to OFF, the leftside steering brake 38L begins to be engaged and finally becomes engaged completely to be ready for a counterclockwise pivot turn (steering brake control range.)

As the rightside operation of the steering lever 57 is identical to the leftside operation, the description thereof is omitted.

The present invention enables a reduction in the number of packages of clutches and brakes from the six packages in the prior art to only five packages. Therefore, the geared steering device can be arranged to be compact. Since only one turn clutch is used in the control operation requiring frequent braking operations, corresponding to two sets of low speed clutches required in the prior art, the turning control can be smoothly carried out without variations at the rightside and the leftside. In addition, the turn control of the geared steering device provides a distinguished characteristic with substantially less braking power loss as compared with the steering control by the brake type steering device. Furthermore, the operation efficiency of steering control is improved by automatic control even in a control area other than for geared steering of the geared steering device. In addition, the steering ratio can be determined by detecting only the power input shaft rotation rate and the turn clutch rotation rate, depending on the configuration of the gear trains, and therefore the control unit of the geared steering device can be simplified and still execute high precision control.

Reasonable variations and modifications of the invention are possible within the scope of the foregoing description and the attached drawings.

We claim:

1. A geared steering device for a crawler vehicle having a prime mover, a rightside track shoe, a leftside track shoe, and rightside and leftside output shafts, for high speed rotation, low speed rotation, and braking to control steering of the rightside and leftside track shoes of the crawler vehicle, said geared steering device comprising:

a power input drive element adapted to receive driving power from the prime mover;

a fixed housing;

a first steering brake for engaging and releasing a first one of the output shafts with respect to the fixed housing;

a first rotatable housing coupled to the first one of said output shafts;

a first direct-coupled clutch for engaging and releasing said first rotatable housing with respect to said power input drive element;

a center shaft;

a first planet gear train having a first sun gear, a first carrier gear, and a first ring gear; each of said first sun gear, said first carrier gear, and said first ring gear being connected to a respective different one of said center shaft, said power input drive element, and said first rotatable housing;

a second steering brake for engaging and releasing a second one of said output shafts with respect to a fixed housing;

a second rotatable housing coupled to the power input drive element;

a drive hub coupled to the second one of the output shafts;

a second planet gear train having a second sun gear, a second carrier gear, and a second ring gear; each of said drive hub and said center shaft being connected to a respective different one of the second sun gear, the second carrier gear, and the second ring gear;

a second direct-coupled clutch for engaging and releasing said second rotatable housing with respect to the second carrier gear;

a third planet gear train having a third sun gear, a third carrier gear, and a third ring gear;

a turn clutch for engaging and releasing one of the gears of the third planet gear train with respect to a fixed housing; each of the second rotatable housing and the turn clutch being connected to a respective different one of the third sun gear, the third carrier gear, and the third ring gear;

wherein the gear of said second planet gear train other than the gears connected to the center shaft and the drive hub is coupled with a gear of the third planet gear train other than the gears of the third planet gear train which are connected to the turn clutch and the second rotatable housing.

2. A geared steering device in accordance with claim 1, wherein the first sun gear is mounted on the center shaft, the first carrier gear is coupled to the power input drive element, and the first ring gear is mounted on the first rotatable housing.

3. A geared steering device in accordance with claim 2, wherein the second sun gear is mounted on the center shaft, the second carrier gear is connected to the drive hub, the third sun gear is connected to the turn clutch, the third ring gear is mounted on the second rotatable housing, and the second ring gear and the third carrier gear are coupled to each other.

4. A geared steering device in accordance with claim 2, wherein the third carrier gear is coupled to the second rotatable housing, and the second ring gear and the third ring gear are coupled to each other.

5. A geared steering device in accordance with claim 2, wherein the second ring gear is coupled to the center shaft, and the second sun gear and the third carrier gear are coupled to each other.

6. A geared steering device in accordance with claim 2, wherein the central shaft is coaxial with the first one of the output shafts and with the first planet gear train.

7. A geared steering device in accordance with claim 6, wherein the first steering brake comprises a first steering brake hub mounted on the first one of said output shafts, and a braking element mounted to said fixed housing for engaging and releasing the first steering brake hub with respect to the fixed housing; and wherein the second steering brake comprises a second steering brake hub mounted on the second one of said output shafts, and a braking element mounted to said fixed housing for engaging and releasing the second steering brake hub with respect to the fixed housing.

8. A geared steering device in accordance with claim 7, wherein the first direct-coupled clutch comprises a first clutch hub connected to the power input drive element, and a first clutch element mounted to the first rotatable housing for engaging and releasing the first clutch hub; and wherein the second direct-coupled clutch comprises a second clutch hub connected to the drive hub, and a clutch element mounted to the second rotatable housing for engaging and releasing the second clutch hub.

9. A geared steering device in accordance with claim 8, wherein the second sun gear is mounted on the center shaft, the second carrier gear is connected to the drive hub, the third sun gear is connected to the turn clutch, the third ring gear is mounted on the second rotatable housing, and the second ring gear and the third carrier gear are coupled to each other.

10. A geared steering device in accordance with claim 8, wherein the third carrier gear is coupled to the second rotatable housing, and the second ring gear and the third ring gear are coupled to each other.

11. A geared steering device in accordance with claim 8, wherein the second ring gear is coupled to the center shaft, and the second sun gear and the third carrier gear are coupled to each other.

12. A geared steering device in accordance with claim 1, wherein the second sun gear is mounted on the center shaft, the second carrier gear is connected to the drive hub, the third sun gear is connected to the turn clutch, the third ring gear is mounted on the second rotatable housing, and the second ring gear and the third carrier gear are coupled to each other.

13. A geared steering device in accordance with claim 1, wherein the third carrier gear is coupled to the second rotatable housing, and the second ring gear and the third ring gear are coupled to each other.

14. A geared steering device in accordance with claim 1, wherein the second ring gear is coupled to the center shaft, and the second sun gear and the third carrier gear are coupled to each other.

15. A geared steering device in accordance with claim 1, further comprising:

a steering lever;

a power input shaft connected to the power input drive element to provide driving power to the power input drive element from the prime mover;

a first sensor for providing a first signal representative of a rotation rate of the power input shaft;

a second sensor for providing a second signal representative of a rotation rate of the turn clutch;

a controller which includes means responsive to an operation of said steering lever to provide a signal representing a steering direction and a signal representing a designated steering ratio, wherein said controller calculates an actual steering ratio from said first and second signals, compares the thus calculated actual steering ratio with the designated steering ratio represented by a signal provided by said means responsive to an operation of the steering lever, and outputs signals for selectively controlling the first and second direct-coupled clutches, the turn clutch, and the first and second steering brakes so as to cause the actual steering ratio to approximate the designated steering ratio.

16. A geared steering device in accordance with claim 15, wherein one of the first and second direct-coupled clutches is in a direction opposite to a steering direction represented by a signal provided by said means responsive to an operation of the steering lever, and wherein the controller also outputs an engagement signal to the one of the first and second direct-coupled clutches which is in a direction opposite to the steering direction represented by a signal provided by said means responsive to an operation of the steering lever.

17. A geared steering device in accordance with claim 15, further comprising a transmission, a torque converter connected between the prime mover and the power input drive element, with the power input shaft being the output shaft of the torque converter and the input shaft of the transmission, a changeover detector associated with the transmission to provide the controller with a speed step signal representative of the speed step of the transmission, and wherein the controller calculates a transmission output shaft rotation rate in response to the first signal and the speed step signal.

18. A geared steering device in accordance with claim 15, wherein each of the first and second direct-coupled clutches, the turn clutch, and the first and second steering brakes is operated hydraulically via the passage of hydraulic fluid through a respective solenoid valve, and wherein the controller outputs signals to respective solenoid valves to selectively control the direct-coupled clutches, the turn clutch, and the steering brakes.

19. A geared steering device in accordance with claim 18, further comprising a transmission, a torque converter connected between the prime mover and the power input drive element, with the power input shaft being the output shaft of the torque converter and the input shaft of the transmission, a changeover detector associated with the transmission to provide the controller with a speed step signal representative of the speed step of the transmission, and wherein the controller calculates a transmission output shaft rotation rate in response to the first signal and the speed step signal.

20. A geared steering device in accordance with claim 19, wherein the controller calculates the actual steering ratio from the second signal and the calculated transmission output shaft rotation rate.

21. A geared steering device in accordance with claim 15, wherein said means responsive to an operation of said steering lever includes a steering direction discriminator and wherein said controller also includes an opposite steering direction direct-coupled clutch ON generator, with the steering direction discriminator outputting a steering direction signal to the opposite steering direction direct-coupled clutch ON generator, and the opposite steering direction direct-coupled clutch ON generator providing an engagement signal to the solenoid of the solenoid valve for the direct-coupled clutch which is on the side opposite the steering direction.

* * * * *